United States Patent [19]

Wakabayashi et al.

[11] Patent Number: 4,697,898
[45] Date of Patent: Oct. 6, 1987

[54] DISPLAY DEVICE OF A CAMERA SYSTEM

[75] Inventors: Hiroshi Wakabayashi, Yokohama; Kazuyuki Kazami; Isao Uchida, both of Tokyo, all of Japan

[73] Assignee: Nippon Kogaku K. K., Tokyo, Japan

[21] Appl. No.: 791,450

[22] Filed: Oct. 25, 1985

[30] Foreign Application Priority Data

Oct. 31, 1984 [JP] Japan .................. 59-228015

[51] Int. Cl.$^4$ .................. G03B 15/01; G03B 17/18
[52] U.S. Cl. .................. 354/127.13; 354/195.13; 354/289.1
[58] Field of Search .................. 354/127.13, 195.13, 354/289.1, 289.12, 195.12

[56] References Cited

U.S. PATENT DOCUMENTS

| | | | |
|---|---|---|---|
| 2,926,579 | 3/1960 | Gebele | 354/195.13 |
| 4,173,401 | 10/1979 | Harvey | 354/21 |
| 4,200,371 | 4/1980 | Suzuki et al. | 354/21 |
| 4,214,829 | 7/1980 | Ohashi | 354/195.12 |
| 4,494,851 | 1/1985 | Maida et al. | 354/421 |
| 4,515,453 | 4/1985 | Wakabayashi et al. | 354/149.1 |

Primary Examiner—W. B. Perkey
Attorney, Agent, or Firm—Shapiro and Shapiro

[57] ABSTRACT

A camera having a photo-taking lens changeable over to two different focal lengths includes display means for displaying a scale indicative of distances, the scale being displayed by the display means so as to be along a predetermined surface, the scale having a plurality of symbols, means for producing a first detection signal when the focal length of the photo-taking lens is one of the two different focal lengths and producing a second detection signal when the focal length of the photo-taking lens is the other of the two different focal lengths, and control means for controlling the display means, the control means being responsive to the first detection signal to control the display means so that a part of the plurality of symbols is displayed and being responsive to the second detection signal to control the display means so that the remainder of the plurality of symbols except said part is displayed.

18 Claims, 12 Drawing Figures

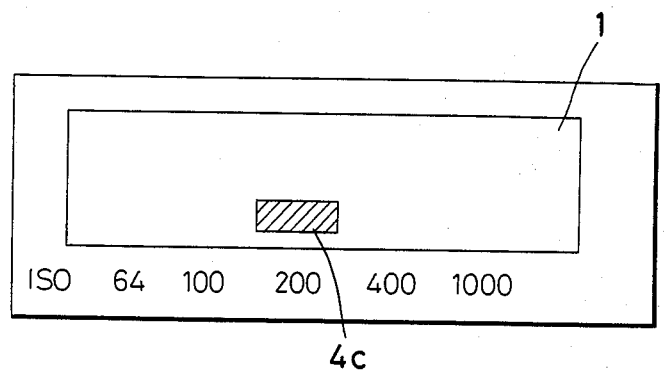
F I G. 3
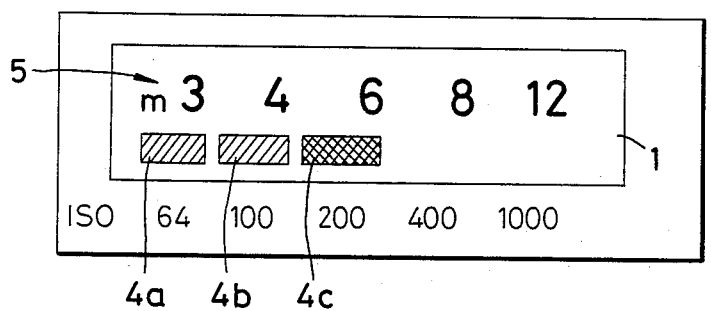
F I G. 4
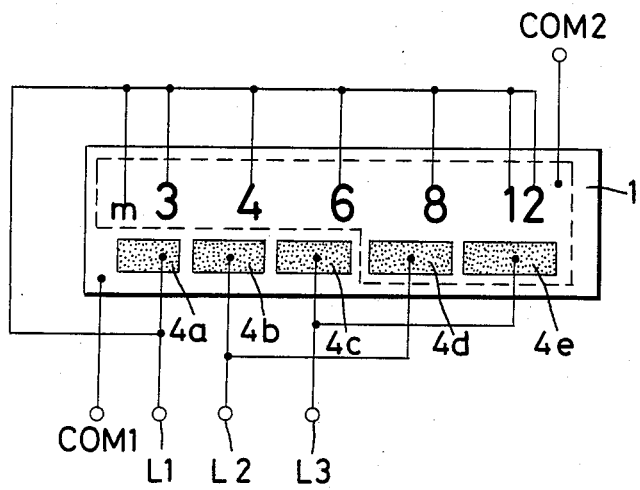
F I G. 5

F I G. 6
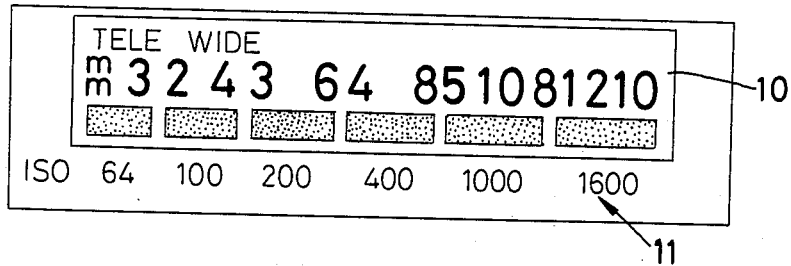
F I G. 7
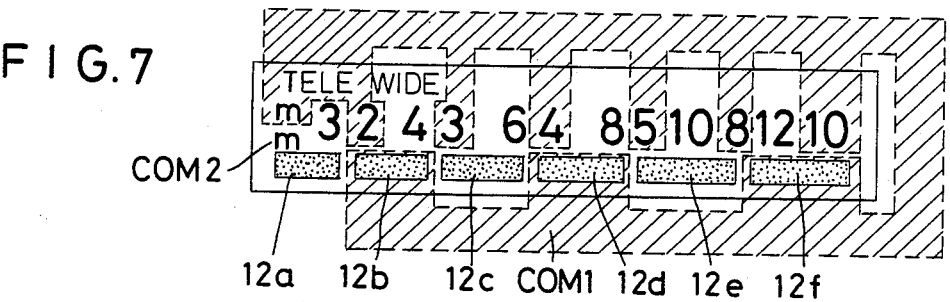
F I G. 8
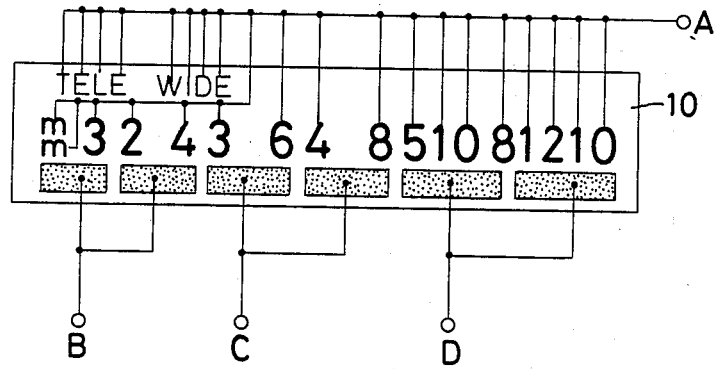

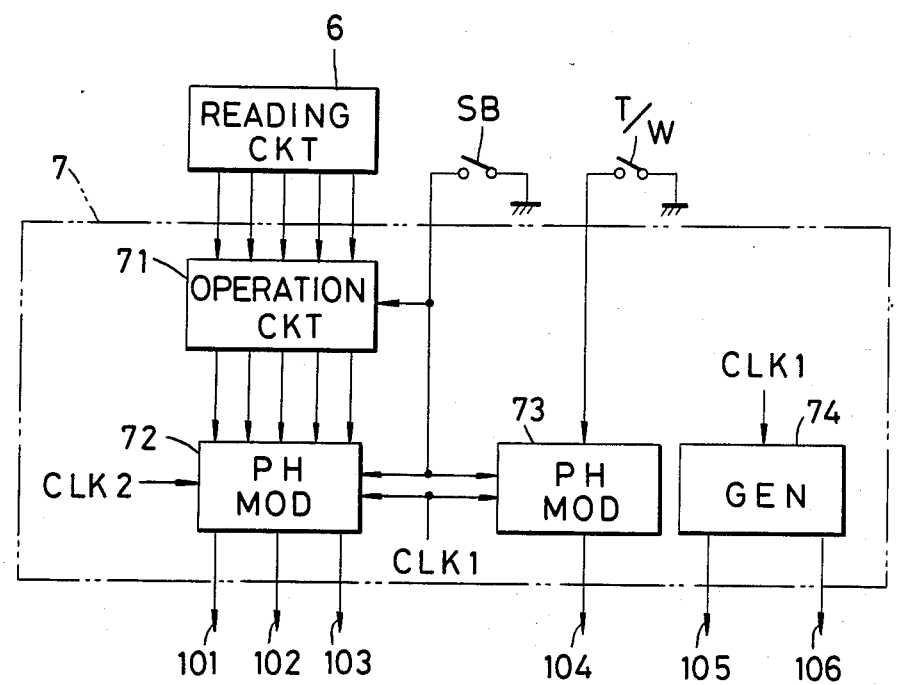

DISPLAY DEVICE OF A CAMERA SYSTEM

BACKGROUND OF THE INVENTION

1. Field of the Invention

This invention relates to a display device for displaying the film speed of a film used and the upper limit object distance over which flash light emitted by a flash device reaches effectively (hereinafter referred to as the effective flash distance).

2. Description of the Prior Art

The effective flash distance of a flash device is varied by the film speed of a film used, but the user has often been liable to forget this fact and fail in photographing. For example, when a film of high film speed is replaced with a film or low film speed, the effective flash distance is decreased, but the user has sometimes effected photography at an object distance exceeding the effective flash distance while forgetting this fact and thus, the resultant photograph has become under-exposed.

Accordingly, a flash device which displays the effective flash distance as disclosed in U.S. Pat. No. 4,494,851 has been devised.

SUMMARY OF THE INVENTION

It is an object of the present invention to provide a display device which is excellent in visual recognizability by displaying the film speed of a film used and the effective flash distance while visually correlating them to each other.

The device of the present invention is best suited particularly as the display device of a camera containing a flash device therein.

BRIEF DESCRIPTION OF THE DRAWINGS

FIG. 3 shows the liquid crystal display plate in the display state during normal photography.

FIG. 4 shows the liquid crystal display plate in the display state during photography accompanied by flash light emission.

FIG. 5 is a connecting diagram showing the connections between the effective flash distance and bar graphs in the liquid crystal display plate.

FIG. 6 is an enlarged plan view of a liquid crystal display plate applied to a two-focus camera according to a second embodiment of the present invention.

FIG. 7 shows the liquid crystal display plate showing the distribution of each common electrode at ½ duty.

FIG. 8 is a connecting diagram showing the connections between the effective flash distance and bar graphs on the liquid crystal display plate of FIG. 6.

FIG. 12 is a block diagram showing the details of the control circuit of FIG. 11.

DESCRIPTION OF THE PREFERRED EMBODIMENTS

Figure 1:
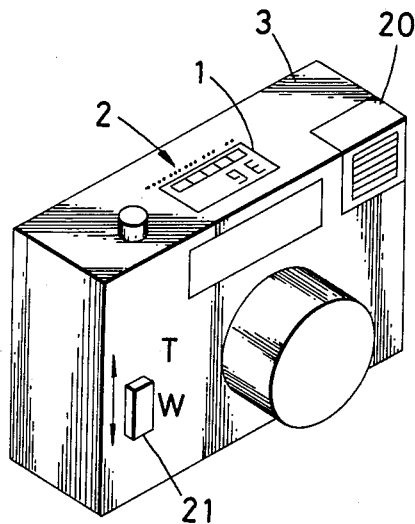
FIG. 1 is a perspective view of a camera having the display device of the present invention.

Referring to FIG. 1, a scale 2 indicating film speeds, i.e., ISO 64, 100, 200, 400 and 1000, is printed on a liquid crystal display plate 1 as a liquid crystal display device provided on the upper portion 3 of a camera containing, for example, a flash device 20 therein, in such a manner that the scale can be easily read by the user of the camera when he levels the camera toward an object.

Figure 2:
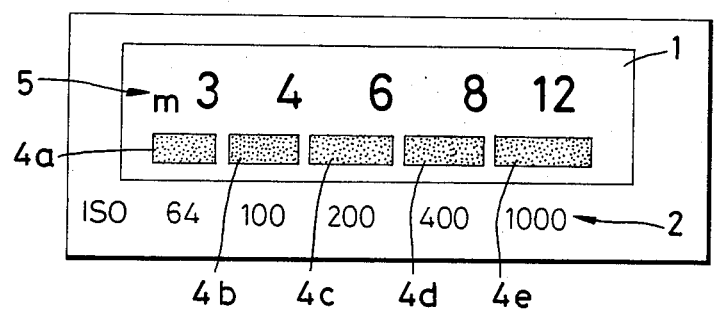
FIG. 2 is an enlarged plan view of the liquid crystal display plate of FIG. 1.

In FIG. 2, a distance division row 5 indicating effective flash distances (shown in m in the present embodiment) are provided on the upper portion of the liquid crystal display plate 1 at positions corresponding to the numerals in the film speed division row 2, and bar graphs (index marks) 4 are provided on the lower portion of the liquid crystal display plate 1 corresponding to the numerals of the effective distances. By the connection of FIG. 5 which will later be described, each bar graph 4a, 4b, 4c, 4d, 4e is an independent liquid crystal pattern and is independently colored and achromatized by the application of a voltage. Also, the liquid crystal patterns of the effective distance division row 5 are collectively colored and achromatized.

The numerical relations between the effective distances and the film speeds shown in FIG. 2 are determined so that the guide number of the flash device 20 is constant.

In the construction of FIG. 2, in the case of normal photography during which the flash device 20 is not used, only a bar graph, e.g. only the bar graph 4c is operated and colored for display on the liquid crystal display plate 1. Accordingly, in the case of normal photography, the film speed of the film used (in FIG. 3, ISO 200) is shown by the coloring of the bar graph.

In the construction of FIG. 2, in the case of flash photography during which the flash device 20 is used, the entire distance division row 5 is colored and at the same time, for example, the bar graphs 4a and 4b are operated and colored for display and the bar graph 4c is turned on and off. By the bar graph 4c being turned on and off, the film speed of the film used can be read as 200 and the effective flash distance can be read as 6m.

When the bar graph 4e is turned on and off and the bar graphs 4a–4d are colored, it shows that the film speed of the film used is 1000 and the effective flash distance is 12m.

FIG. 5 is a connecting diagram of a display driving circuit which is matrix-driven an ½ duty and effects coloring and achromatization on the liquid crystal display plate, for illustrating the displays of FIGS. 3 and 4.

The common electrode COM1 of the liquid crystal display plate 1 is provided on the side of the three bar graphs 4a, 4b and 4c indicating 3m, 4m and 6m of the distance division row 5, and the common electrode COM2 of the liquid crystal display plate 1 is provided in the area of the unit m and numerals 3, 4, 6, 8 and 12 of the distance division row 5 and the two bar graphs 4d and 4e indicating 8m and 12m (the area encircled by a broken line). On the liquid crystal display plate, the common electrodes COM1 and COM2 are electrically separated and distributed in the range indicated by the broken line. A line L1 is connected to the bar graph 4a and the entire distance division row (including the unit m), a line L2 is connected to the bar graphs 4b and 4d and a line L3 is connected to the bar graphs 4c and 4e.

The display of FIG. 3 during normal photography will hereinafter be described by reference to FIG. 5. A voltage is applied between the common electrode COM1 and the line L3, whereby the bar graph 4c indicating the film speed ISO 200 is colored. When ISO 64 is to be indicated, a voltage is applied between the common electrode COM1 and the line L1; when ISO 100 is to be indicated, a voltage is applied between the common electrode COM1 and the line L2; when ISO 400 is to be indicated, a voltage is applied between the common electrode COM2 and the line L2; and when ISO 1000 is to be indicated, a voltage is applied between the common electrode COM2 and the line L3.

The display of FIG. 4 will now be described by reference to FIG. 5. A voltage is applied between the common electrode COM1 and the line L1, between the common electrode COM1 and the line L2, between the common electrode COM1 and the line L3 and between the line L1 and the common electrode COM2, by dynamic drive, whereby the distance divisions 3, 4, 6, 8, 12 and the distance unit m are collectively colored, the bar graphs 4a and 4b indicating the distance divisions 3 and 4 are colored and the bar graph 4c indicating the distance division 6 is turned on and off (flash photography). By the bar graph 4c being turned on and off, it is clearly shown that the film speed of the film used is 200.

As shown in FIG. 5, the liquid crystal display plate 1 has the two common electrodes COM1 and COM2 and therefore, matrix driving is effected at ½ duty. The operation of such liquid crystal display is known from timepieces or electronic desk top calculators which effect liquid crystal display. The effective range of the effective flash distance during flash photography is displayed by the turn-on-and-off of the bar graphs. Moreover, the film speed of the film used can also be clearly shown by the turn-on-and-off of the bar graphs.

FIG. 6 is an enlarged plan view of a second embodiment of the present invention which is a liquid crystal display plate applied to a two-focus camera as disclosed in U.S. Pat. No. 4,515,453 wherein two focal lengths (TELE and WIDE) are obtained by the change-over of a photo-taking optical system. The case where the photo-taking lens has a long focal length is called TELE, an the case where the photo-taking lens has a short focal length is called WIDE.

The relations between the effective flash distances in the case of TELE and the case of WIDE shown in FIG. 6 and each film speed are determined so that the guide number of the flash device is constant, as in the first embodiment. As the effective flash distances corresponding to a film speed division row 11, numerals for TELE and numerals for WIDE are printed in juxtaposed relationship with one another because the brightness (F-number) of the lens differs for the two focuses TELE and WIDE. The lens of WIDE has a greater effective flash distance than the lens of TELE. Whether the photo-taking lens is in the TELE state or in the WIDE state is transmitted to a control circuit by the ON-OFF of the switch T/W of FIG. 11 operatively associated with the operating member 21 of FIG. 1, and only when a switch SB is in its ON position, that is, only when the use of the flash device 20 has been selected, the display mode is changed over as described below. The operating member 21 is a member operated for the change-over of TELE and WIDE.

FIG. 7 shows the electrically separated distribution of the common electrodes COM1 and COM2 of the liquid crystal display plate 10, and the portion indicated by hatching (including the distance divisions and bar graphs 12b, 12d and 12f which effect the display operation in the case of TELE) is connected to the common electrode COM1, and the non-hatching portion is connected to the common electrode COM2.

FIG. 8 shows a connecting diagram of the distance division row and bar graphs by external lines A, B, C and D.

The line A is connected to each of characters T, E, L, E; W, I, D, E, distance units m and m, and all of the distance scale numerals 3, 2, 4, 3, 6, 4, 8, 5, 10, 8, 12 and 10.

The line B is connected to the two left bar graphs 12a and 12b of the liquid crystal display plate.

The line C is connected to the two middle bar graphs 12c and 12d of the liquid crystal display plate.

The line D is connected to the two right bar graphs 12e and 12f of the liquid crystal display plate.

Figure 9:
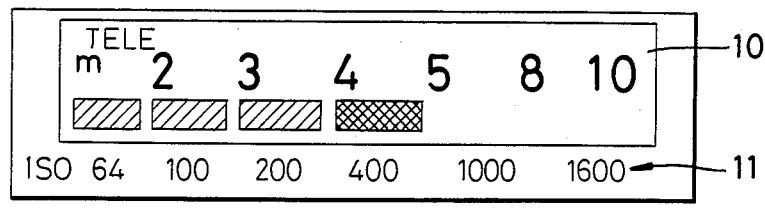
FIG. 9 shows the display state of flash photography when the photo-taking lens has a long focal length in FIG. 6.

In FIGS. 7 and 8, a voltage is applied between the common electrode COM1 and the line A, whereby the characters T, E, L, E, the unit name m and the distance scale numerals 2, 3, 4, 5, 8 and 10 are collectively colored. A voltage is applied between the common electrode COM1 and the line B and between the common electrode COM1 and the line C, whereby four bar graphs indicating the distance scale numerals 2, 3, 4 and 5 are colored. This state is shown in FIG. 9 (the display state in the case of TELE).

Figure 10:
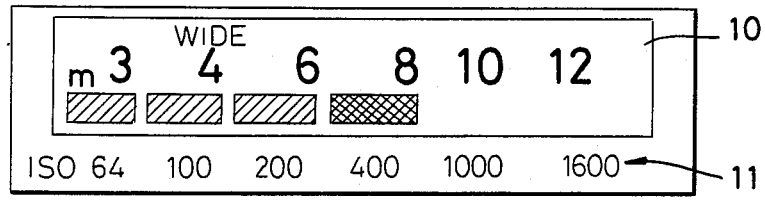
FIG. 10 shows the display state of flash photography when the photo-taking lens has a short focal length in FIG. 6.

A voltage is applied between the common electrode COM2 and the line A, whereby the characters W, I, D, E, the unit name m and the distance scale numerals 3, 4, 6, 8, 10 and 12 are collectively colored. A voltage is applied between the common electrode COM2 and the line B and between the common electrode COM2 and the line C, whereby the unit name m and four bar graphs indicating the distance scale numerals 3, 4, 6 and 8 are colored. This state is shown in FIG. 10 (the display state in the case of WIDE).

Figure 11:
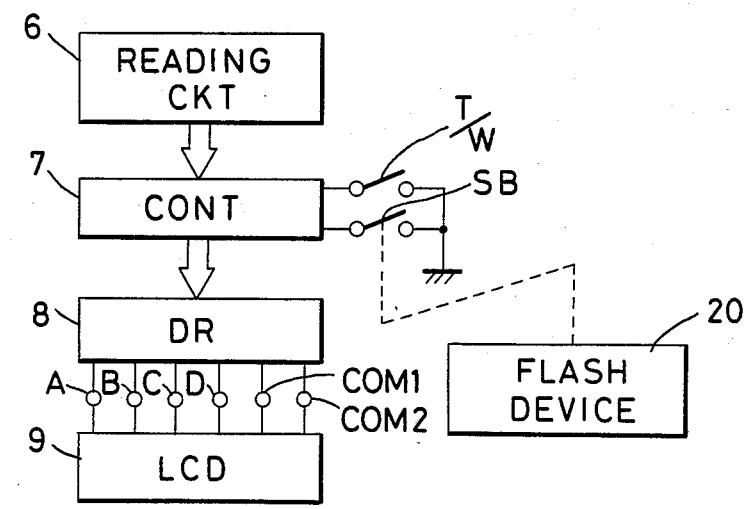
FIG. 11 is a block diagram of circuits in the camera having the device of the present invention.

FIG. 11 is a block diagram of circuits in a camera using the film speed displaying device of the present invention, and illustrates how the effective flash distance can be displayed before photography when a film is loaded into the camera.

As disclosed in U.S. Pat. Nos. 4,200,371 and 4,173,401, when, for example, a magazine imparting information representative of the film speed at 3 bits is inserted into a camera, the film speed is read by a reading circuit 6 for automatically reading the film speed and is transmitted to a control circuit 7. The control circuit 7 drives a display driving circuit 8 in the same manner as that described by reference to FIGS. 3 and 5 and causes a liquid crystal display device (hereinafter referred to as LCD) 9 to effect the display as shown in FIG. 3. The LCD 9 corresponds to the display plate 10 of FIGS. 6–10.

Switch SB is closed in response to the initiation of the charge accumulation of the main capacitor of a flash device 20 or to the popping-up of the flash device. In response to the use of the flash device 20 being selected, the switch SB is closed and the control circuit 7 drives the display driving circuit 8 in the same manner as that described by reference to FIGS. 4 and 5 and causes the LCD 9 to effect the displays as shown in FIGS. 9 and 10.

The above-described voltage application is matrix driving done to the common electrodes COM1 and COM2 at ½ duty.

The film speeds of FIGS. 9 and 10 are both ISO 400, but since the brightness of the lens used differs, it is seen that in the case of TELE, the effective flash distance arriving at the object to be photographed is effective up to 5m and in the case of WIDE, it is effective up to 8m.

In the liquid crystal display plate 10 of FIGS. 9 and 10, if the distance indicating bar graph corresponding to ISO 400 is turned on and off in the matrix of the common electrode COM1 and line C, the film speed of the film used can be shown more clearly.

In the construction of FIG. 6, in the case of normal photography, the switch SB is opened, the distance division row is achromatized on the liquid crystal display plate 10 and a voltage is applied between the common electrode COM1 and the line C, whereby the bar graph indicating the film speed ISO 400 is colored, as in the first embodiment.

While embodiments of the camera provided with a flash device having a constant guide number have been shown above, the quantity of light of the flash device may vary in the present invention and the distance division row may be changed over in response to the change-over of the quantity of light of the flash device as in response to the change-over of WIDE and TELE. The effective distance division row is not limited to two stages, but if the variation in quantity of light is of three stages, the number of the corresponding stages of distance may of course be increased to three.

Also, in the present embodiments, the bar graphs (index marks) are disposed between the film speed division row and the distance division row, but the present invention is not restricted thereto; but the two division rows may be directly opposed to each other and the bar graphs may be disposed at one side of the two division rows in opposed relationship with the latter.

As described above, according to the present invention, in a camera which can be operatively associated with a flash device, a division row indicative of the film speeds, a division row displaying the effective flash distances corresponding to the film speeds when the use of the flash device is selected, and electro-optical element rows corresponding to the film speeds are provided in parallel relationship with one another, and the electro-optical element rows can be selectively driven in conformity with the film speed used and both of the film speed used and the effective flash distance can be displayed on the liquid crystal display device before photography and therefore, the average camera user can simply know the film speed used and the effective flash distance before photography.

In FIG. 12, the reading circuit 6 produces a signal of 5 bits in accordance with a signal of 3 bits indicative of the film speed. An operation circuit 71 processes the signal from the reading circuit 6 in response to the change-over of ON-OFF of the switch SB, and puts out the result of the processing to a phase modulator 72. The phase modulator 72 puts out to the driving circuit 8 shown in FIG. 11 the same three driving signals 101, 102 and 103 as the signals produced from lines B, C and D, in synchronism with a clock signal CLK1 on the basis of the output from the operation circuit 71. A phase modulator 72 controls the phases of the three driving signals 101, 102 and 103 in accordance with the output from the operation circuit 71 and the switch SB. A phase modulator 73 controls the phase of the same signal 104 as the signal produced from a line A in accordance with the switches SB and T/W, in synchronism with the clock signal CLK1. A generator 74 generates the same driving signals 105 and 106 as the signals applied to the electrodes COM1 and COM2, in synchronism with the clock signal CLK1. The driving signals 104, 105 and 106 are also input to the driving circuit 8. The driving circuit 8 functions as an interface. Also, the phase modulator 72 controls the phase of one of the three driving signals so that the bar graph 12d of FIG. 7 is turned on and off in accordance with a clock signal CLK2 when a film of ISO 400, for example, is loaded into the camera and the switch SB is closed. The phases of the driving signals 105 and 106 do not change.

What we claimed is:

1. A camera having a photo-taking lens whose focal length is changeable, said camera including:
    (a) means responsive to said photo-taking lens for producing a detection signal according to the focal length of said photo-taking lens;
    (b) flash means for emitting flash light;
    (c) display means; and
    (d) control means responsive to said detection signal to cause said display means to display the distance to objects which can be photographed when said flash means emits the flash light.

2. A camera according to claim 1, wherein said display means has a plurality of parts for displaying the distance to objects which can be photographed when said flash means emits the flash light, and said plurality of parts are arranged on a predetermined surface of said camera.

3. A camera according to claim 2, wherein said plurality of parts are arranged in one direction on said predetermined surface.

4. A camera having a photo-taking lens whose focal length is changeable, said camera including:
    (a) display means for displaying a scale indicative of distances, said scale being displayed by said display means so as to be along a predetermined surface, said scale having a plurality of symbols which form a plurality of groups, said plurality of symbols being arranged in one row on said predetermined surface so that symbols of one of said plurality of groups are adjacent to symbols of another of said plurality of groups;
    (b) means responsive to said photo-taking lens for producing a detection signal according to the focal length of said photo-taking lens; and
    (c) control means responsive to said detection signal for selecting one of said plurality of groups and causing said display means to display said plurality of symbols of said selected one of said plurality of groups.

5. A camera having a photo-taking lens changeable over to two different focal lengths, said camera including:
    (a) display means for displaying a scale indicative of distances, said scale being displayed by said display means so as to be along a predetermined surface, said scale having a plurality of symbols;
    (b) means for producing a first detection signal when the focal length of said photo-taking lens is one of said two different focal lengths and producing a second detection signal when the focal length of said photo-taking lens is the other of said two different focal lengths; and
    (c) control means for controlling said display means, said control means being responsive to said first detection signal to control said display means so that a part of said plurality of symbols constituted by every other symbol is displayed and being responsive to said second detection signal to control said display means so that the remainder of said plurality of symbols except said part is displayed, said plurality of symbols being arranged in a single row along said predetermined surface.

6. A camera having a photo-taking lens changeable over to two different focal lengths, said camera including:
   (a) display means for displaying a scale indicative of distances, said scale being displayed by said display means so as to be along a predetermined surface, said display means displaying a plurality of index marks, said plurality of index marks being displayed so as to be arranged in opposed relationship with said scale and substantially along said predetermined surface, said scale having a plurality of symbols;
   (b) means for producing a first detection signal when the focal length of said photo-taking lens is one of said two different focal lengths and producing a second detection signal when the focal length of said photo-taking lens is the other of said two different focal lengths;
   (c) control means for controlling said display means, said control means being responsive to said first detection signal to control said display means so that a part of said plurality of symbols is displayed and being responsive to said second detection signal to control said display means so that the remainder of said plurality of symbols except said part is displayed; and
   (d) means for producing a film speed signal indicative of the film speed of a film and wherein said control means controls said display means in accordance with said film speed signal so that at least one of said plurality of index marks is displayed.

7. A camera according to claim 6, further having a plurality of other symbols indicative of different film speeds, said plurality of other symbols being secured to said camera so as to be opened to said plurality of index marks and substantially along said predetermined surface.

8. A camera according to claim 7, further including flash means capable of emitting a flash light and wherein when said flash means is capable of emitting a flash light, said control means controls said display means so that said scale is displayed.

9. A camera having a photo-taking lens changeable over to two different focal lengths, said camera including:
   (a) display means for displaying a scale indicative of distances, said scale being displayed by said display means so as to be along a predetermined surface, said scale having a plurality of symbols;
   (b) means for producing a first detection signal when the focal length of said photo-taking lens is one of said two different focal lengths and producing a second detection signal when the focal length of said photo-taking lens is the other of said two different focal lengths;
   (c) control means for controlling said display means, said control means being responsive to said first detection signal to control said display means so that a part of said plurality of symbols is displayed and being responsive to said second detection signal to control said display means so that the remainder of said plurality of symbols except said part is displayed; and
   (d) flash means emitting flash light, said plurality of symbols of said scale being indicative of the distances to objects which can be photographed when said flash means emits flash light.

10. A camera according to claim 9, wherein said control means is responsive to said first detection signal to cause said display means to display said part of said plurality of symbols corresponding to said one of said two different focal lengths, and is responsive to said second detection signal to cause said display means to display said remainder of said plurality of symbols corresponding to said other of said two different focal lengths.

11. A camera having a photo-taking lens whose focal length is changeable, said camera including:
   (a) display means for displaying a plurality of index marks and a scale indicative of distances, said scale being displayed by said display means so as to be along a predetermined surface, said plurality of index marks being displayed so as to be arranged in opposed relationship with said scale and substantially along said predetermined surface, said scale having a plurality of symbols which form a plurality of parts;
   (b) means responsive to said photo-taking lens for producing a detection signal indicative of the focal length of said photo-taking lens;
   (c) control means responsive to said detection signal for selecting one of said plurality of parts and causing said display means to display said plurality of symbols of said selected one of said plurality of parts; and
   (d) means for producing a film speed signal indicative of a film speed, said control means controlling said display means in accordance with said film speed signal so that at least one of said plurality of index marks is displayed.

12. A camera having a photo-taking lens whose focal length is changeable, said camera including:
   (a) display means for displaying a scale indicative of distances, said scale being displayed by said display means so as to be along a predetermined surface, said scale having a plurality of symbols which form a plurality of parts;
   (b) means responsive to said photo-taking lens for producing a detection signal indicative of the focal length of said photo-taking lens;
   (c) control means responsive to said detection signal for selecting one of said plurality of parts and causing said display means to display said plurality of symbols of said selected one of said plurality of parts; and
   (d) flash means emitting flash light, said plurality of symbols of said scale being indicative of the distance to objects which can be photographed when said flash means emits the flash light.

13. A device for emitting a flash light toward an object to be photographed to photograph the image of the object on a film, said device including:
   (a) a first scale formed by a pluralitly of symbols arranged so as to be substantially along a predetermined surface, said plurality of symbols being indicative of different film speeds, said plurality of symbols being secured to said device;
   (b) display means for displaying a plurality of index marks and a second scale indicative of distances, said plurality of index marks being opposed to said first scale and displayed by said display means so as to be substantially along said predetermined surface, said second scale having a plurality of symbols, said plurality of symbols of said second scale being opposed to said plurality of index marks and displayed by said display means so as to be substantially along said predetermined surface;

(c) a member operable for said flash light emission;

(d) means for detecting that said member is operated and producing a detection signal; and (e) control means for controlling said display means so that at least one of said plurality of index marks is displayed and said plurality of symbols of said second scale are not displayed, said control means being responsive to said detection signal to control said display means so that at least one of said plurality of index marks and at least one of said plurality of symbols of said second scale are displayed.

14. A device according to claim 13, further including means for producing a film speed signal indicative of the film speed of a film and wherein said plurality of index marks correspond to said plurality of symbols of said first scale, and said control means controls said display means so that one of said plurality of index marks which is opposed to one of said plurality of symbols of said first scale which corresponds to the film speed indicated by said film speed signal is displayed.

15. A device according to claim 13, wherein said plurality of symbols of said second scale are the distances to objects capable of being photographed during said flash light emission.

16. A camera for emitting a flash light toward an object to be photographed to photograph the image of the object on a film, said camera including:

(a) a first scale formed by a plurality of symbols arranged so as to be substantially along a predetermined surface, said plurality of symbols being indicative of different film speeds, said plurality of symbols being secured to a flash device;

(b) display means for displaying a plurality of index marks and a second scale indicative of distances, said plurality of index marks being opposed to said first scale and displayed by said display means so as to be substantially along said predetermined surface, said second scale having a plurality of symbols, said plurality of symbols of said second scale being opposed to said plurality of index marks and displayed by said display means so as to be substantially along said predetermined surface;

(c) means for producing a first detection signal when said camera effects photography accompanied by flash light emission and producing a second detection signal when said camera effects photography not accompanied by flash light emission; and (d) control means for controlling said display means, said control means being responsive to said first detection signal to control said display means so that at least one of said plurality of index marks and at least one of said plurality of symbols of said second scale are displayed and being responsive to said second detection signal to control said display means so that at least one of said plurality of index marks is displayed and said plurality of symbols of said second scale are not displayed.

17. A camera according to claim 16, further including means for producing a film speed signal indicative of the film speed of a film and wherein said plurality of index marks correspond to said plurality of symbols of said first scale, and said control means controls said display means so that one of said plurality of index marks which is opposed to one of said plurality of symbols of said first scale which corresponds to the film speed indicated by said film speed signal is displayed.

18. A camera according to claim 16, wherein said plurality of symbols of said second scale are the distances to objects capable of being photographed during said flash light emission.

* * * * *